(12) United States Patent
Nakamura et al.

(10) Patent No.: US 7,218,366 B2
(45) Date of Patent: May 15, 2007

(54) TRANSREFLECTIVE LCD HAVING COLOR ADJUSTING WINDOWS SUBSTANTIALLY SAME SIZE AND SHAPE, BUT DIFFERENT IN NUMBER IN AT LEAST 2 DIFFERENT COLORS

(75) Inventors: Shinji Nakamura, Kanagawa (JP); Masato Imai, Kanagawa (JP); Yoko Fukunaga, Kanagawa (JP); Akira Maehara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/311,569

(22) Filed: Dec. 19, 2005

(65) Prior Publication Data

US 2006/0098143 A1    May 11, 2006

Related U.S. Application Data

(63) Continuation of application No. 10/471,372, filed on Sep. 9, 2003, now Pat. No. 7,148,938.

(51) Int. Cl.
*G02F 1/1335* (2006.01)
(52) U.S. Cl. .................. 349/114; 349/106; 349/113
(58) Field of Classification Search ................ 349/114, 349/106, 113
See application file for complete search history.

(56) References Cited

U.S. PATENT DOCUMENTS 6,215,538 B1    4/2001   Narutaki et al.
6,885,418 B2 *  4/2005   Matsushita et al. ......... 349/113
2002/0075429 A1  6/2002  Fujioka

FOREIGN PATENT DOCUMENTS

| JP | 10-142621    | 5/1998  |
|----|--------------|---------|
| JP | 2000-11902   | 1/2000  |
| JP | 2000-29012   | 1/2000  |
| JP | 2000-47189   | 2/2000  |
| JP | 2001-330715  | 11/2001 |
| JP | 2001-3300715 | 11/2001 |
| JP | 2002-328365  | 11/2002 |
| KR | 2002-003758  | 1/2002  |

* cited by examiner

*Primary Examiner*—David Nelms
*Assistant Examiner*—(Nancy) Thanh-Nhan Phan Nguyen
(74) *Attorney, Agent, or Firm*—Robert J. Depke; Rockey, Depke, Lyons & Kitzinger LLC.

(57) ABSTRACT

A liquid crystal display device, by which a reduction of costs of a color filter is realized and declining of the transmittance or reflectance due to an alignment error is suppressed, comprising a pair of substrates arranged facing to each other over a liquid crystal layer, wherein one substrate is formed pixels PXL arranged in matrix. Each pixel is formed a reflection portion for reflecting an outside light and a transmission portion for transmitting a light. The other substrate is formed a color filter colored to be different colors (red, green and blue) corresponding to respective pixels. One or more color adjusting windows CFW having a coloring concentration of zero or less than that of other portions are provided on reflection regions CFR superposing with reflection portions inside pixel regions corresponding to respective pixels.

1 Claim, 18 Drawing Sheets

TRANSREFLECTIVE LCD HAVING COLOR ADJUSTING WINDOWS SUBSTANTIALLY SAME SIZE AND SHAPE, BUT DIFFERENT IN NUMBER IN AT LEAST 2 DIFFERENT COLORS

The subject matter of application Ser. No. 10/471,372 is incorporated herein by reference. The present application is a continuation of U.S. Ser. No. 10/471,372, filed Sep. 9, 2003, now U.S. Pat. No. 7,148,938 which claims priority to Japanese Patent Application No. JP 2002-013611 filed Jan. 23, 2002 which are incorporated herein by reference.

TECHNICAL FIELD

The present invention relates to an active matrix type liquid crystal display device, particularly relates to a so-called hybrid type liquid crystal display device wherein both of a reflection portion and a transmission portion exist in each pixel, furthermore specifically relates to a configuration of a color filter able to be applied to both of the reflection portion and the transmission portion.

BACKGROUND ART

A hybrid type liquid crystal-display device is disclosed, for example, in the Japanese Unexamined Patent Publication No. 11-52366 and the Japanese Unexamined Patent Publication No. 11-183892. A hybrid type liquid crystal display device performs reflection type display by using an outside light by reflecting the outside light irradiating from the front surface side on a reflection layer on the back surface side when a sufficiently bright outside light (natural light and room lighting, etc.) can be obtained, while when sufficient outside light cannot be obtained, it performs transmission type display by using a light of a backlight arranged on the back surface side of the liquid crystal display device.

FIGS. 1A and 1B are schematic views of an example of a conventional hybrid type liquid crystal display device. FIG. 1A shows the configuration of a section of one pixel.

As shown in the figures, the hybrid type liquid crystal display device comprises a pair of a first substrate 1 and a second substrate 2 arranged facing to each other at the front and back. On the inner surface side of the first substrate 1 is formed a transparent common electrode 3, and on the inner surface side of the second substrate 2 is formed a pixel electrode 4. A pixel is formed at a part where the common electrode 3 formed on the first substrate 1 and respective pixel electrodes 4 formed on the second substrate 2 face to each other. By being matched with the pixel, a color filter CF is provided on the first (front side) substrate 1.

Below, the first substrate 1 provided with the color filter CF will be referred to as a CF substrate in some cases in the present specification.

A liquid crystal layer 5 as an electric optical layer is held between the pair of the first and second substrates 1 and 2 at the front and back. The liquid crystal layer 5 blocks/transmits an incident light for each pixel in response to a voltage applied between the electrodes 3 and 4.

The second (back side) substrate 2 is provided with a reflection layer 6. The reflection layer 6 has an opening for every pixel and flatly divides each pixel to a transmission portion T in the opening and a reflection portion R outside the opening. In the present example, the reflection layer 6 is made of a metal film formed on a relief shape surface of the substrate 2 and composes a part of the pixel electrode 4 explained above. Also, the transmission portion T is formed a transparent conductive film, such as ITO, and the opening explained above is formed and composes a part of the pixel electrode 4.

As is clear from the above explanation, the pixel electrode 4 formed on the second substrate 2 has the hybrid configuration of the metal film provided to the reflection portion R and the transparent conductive film provided on the transmission portion T. Such a pixel electrode 4 is driven for every pixel by a switching element, for example, driven by a thin film transistor (TFT).

The second substrate 2 being formed the TFT for driving pixels will be referred to as a TFT substrate in some cases in the present specification below.

The color filter CF is separately configured for a reflection region CFR corresponding to the reflection region R and a transmission region CFT corresponding to the transmission region T by using different materials. As shown in the figure, a light transmits the color filter CF twice in the reflection region CFR. On the other hand, a light transmits the color filter CF only once in the transmission region CFT.

Therefore, in order not to cause much difference in color tone between the reflection portion R and the transmission portion T, a coloring concentration of the reflection region CFR is made lower than that of the transmission region CFT in advance. For this reason, even a part of a color filter CF colored to be an identical color in an identical pixel was conventionally produced by separate processes by using different materials in the reflection region CFR and the transmission region CFT.

FIG. 1B schematically illustrates a plane shape of a liquid crystal display device shown in FIG. 1A. As shown in the figure, respective pixels PXL are separated in lattice by a black mask BM. Each pixel PXL is flatly divided to a transmission portion T at the center and a reflection portion R around it and has a so-called hybrid configuration. The color filter is patterned so as to approximately correspond to the pixels marked off by the black mask BM. Typically, pixel regions of the color filter corresponding to respective pixels PXL are colored to be three primary colors, red, green and blue.

A hybrid type liquid crystal display device aims to always realize an easy-to-watch display under any circumstances. Thus, it becomes a reflection type display for displaying a screen by using a reflection light in the same way as a printed matter in a bright circumstance, while in a dark circumstance, it becomes a transmission type display by using a backlight. To realize a color display by such a hybrid type display, it is necessary to form a color filter adjusted to the transmission type and a color filter adjusted to the reflection type on the CF substrate side. Conventionally, a method of forming a color filter separately through a production process of a transmission type CF and a production process of a reflection type CF was general.

However, this method requires a longer production process and more materials and kinds to be used. Therefore, there is a disadvantage that a color filter used in a hybrid type display becomes double in production costs comparing with a color filter used in a normal transmission type display.

Also, when forming both of the transmission type color filter and the reflection type color filter in one pixel, there is a disadvantage that the transmittance or reflectance declines when an alignment error arises between the two.

DISCLOSURE OF THE INVENTION

An object of the present invention is to reduce costs of a color filter by realizing a reduced process with less materials and to provide a liquid crystal display device comprising a color filter by which declining of the transmittance or reflectance due to an alignment error is not caused.

To attain the above object, a first aspect of the present invention is a liquid crystal display device characterized by comprising a pair of first substrate and a second substrate arranged facing to each other over a liquid crystal layer, the first substrate is formed pixels arranged in matrix, and each pixel is formed a reflection portion to reflect an outside light and a transmission portion to transmit a light, and the second substrate is formed a color filter colored to be different colors corresponding to respective pixels; wherein the device comprises one or more color adjusting windows having a coloring concentration of zero or less than that of other portions are provided inside pixel regions corresponding to respective pixels and on reflection regions superposing with the reflection portions in the color filter.

Preferably, the color adjusting window is formed inside the reflection region leaving a distance of 2 μm or more from an edge of the reflection region. Also, the color filter comprises a plurality of color adjusting windows in one pixel region, and respective windows are separated from one another by 10 μm or more in the pixel region. Also, a plurality of windows are arranged for respective pixel regions of different colors and arrangement directions of the plurality of windows are different between the pixel regions of different colors in the color filter. Alternately, one window is arranged for respective pixel regions of different colors and an arrangement direction of the window is different between the pixel regions of different colors in the color filter. Also, pixel regions of different colors are directly adjacent to each other not over a black mask in the color filter.

Also, a second aspect of the present invention is a liquid crystal display device characterized by comprising a pair of first substrate and a second substrate arranged facing to each other over a liquid crystal layer, the first substrate is formed pixels arranged in matrix, and each pixel is formed a reflection portion to reflect an outside light and a transmission portion to transmit a light, and the second substrate is formed a color filter for coloring respective pixels to be different colors; wherein arrangement coordinates of the transmission portion in a pixel is different between pixels colored to be different colors.

According to the present invention, a reflection region and a transmission region form a common color filter in basically separate pixel region. Because different materials and separate production processes are not applied for the reflection region and transmission region as in the conventional method, a cost reduction can be attained. On the reflection region, one or more color adjusting windows having a coloring concentration of zero or less than that of other portions is formed. By providing the windows, there is not much difference in color tone between the reflection region and the transmission region. In other words, a color filter applied to the transmission type is formed allover the pixel region and windows are provided on a part of the reflection region based on a specific rule. Due to this, it optically functions as a color filter applied to the reflection type. Consequently, a two-way type color filter can be produced at a low cost without using special materials for a color filter applied to a reflection type and without performing a production process of a reflection type color filter.

BEST MODE FOR CARRYING OUT THE INVENTION

Below, preferred embodiments of the present invention will be explained in detail with reference to the drawings.

Figure 2:
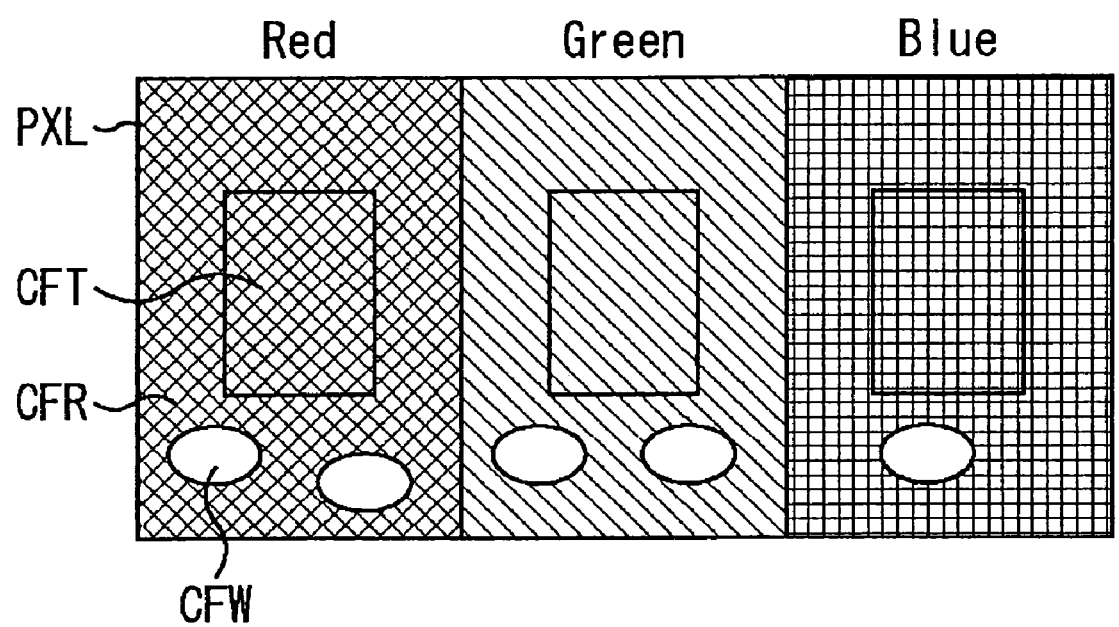
FIG. 2 is a plan view of a principle part of a liquid crystal display device according to the present invention.

FIG. 2 is a schematic plan view of a principle part of a liquid crystal display device according to the present invention.

Generally, an active matrix type liquid crystal display device comprises a pair of a first substrate (CF substrate) and a second substrate (TFT substrate) arranged facing to each other over a liquid crystal layer. The TFT substrate is formed pixels PXL arranged in matrix, and each pixel is formed a reflection portion for reflecting an outside light and a transmission portion for transmitting a light. On the other hand, the CF substrate is formed a color filter colored to be different colors corresponding to respective pixels PXL. In FIG. 2, pixels colored to be three primary colors, red, green and blue, respectively are shown as a set to facilitate understanding. This color filter CF comprises a reflection region CFR corresponding to the reflection portion and a transmission region CFT corresponding to the transmission portion inside the pixel regions corresponding to the respective pixels PXL.

In the present embodiment, a common color filter is formed over both of the reflection region CFR and the transmission region CFT. Accordingly, there is no difference between the reflecting color filter CF and the transmitting color filter CF in terms of materials. Instead, the reflection region CFR of the color filter CF is formed one or more color adjusting windows CFW having a coloring concentration of zero or less than that of other portions. Basically, by forming the windows (hereinafter, also referred to as CF windows) on the color filter applied to the transmission type, optical characteristics required to a color filter CF of the reflection region CFR are realized.

Namely, an equivalent reflecting CF can be formed by providing the windows without using materials for a reflection CF.

Generally, the minimum unit that can be identified by human eyes is 30 µm square or so. By making the color adjusting CF windows as fine as 30 µm or less, an existence of the CF windows become visually indistinctive but able to adjust color tone of the color filter CF of the reflection region CFR.

Preferably, the color adjusting windows CFW are formed inside the reflection region CFR and away from the edges by 2 µm or more. By arranging the windows CFW inside the pixel region, even when there is an alignment error, the aperture ration of the windows is made constant by keeping the windows not superposing with windows CFW of adjacent pixels. The aperture ration of the windows delicately affects color tone of the color filter, so that is has to be controlled at high accuracy. In this case, it is preferable to form the windows CFW inside the pixel region by 2 µm or more considering an alignment error between pixels.

In the color filter according to the present embodiment, a plurality of color adjusting windows CFW are included in one pixel region in some cases. In an example shown in FIG. 2, two CF windows are respectively provided to red and green color filters. In this case, the CF windows are preferably formed away from each other by 10 µm or more in the pixel region. Generally, the CF windows can be formed by using a photolithography technique. In this case, when considering resolution of an exposure apparatus, etc., highly accurate CF windows can be formed by leaving a distance of 10 µm. When the CF windows get closer than that, it sometimes becomes difficult to separate the two in photolithography.

Figure 3:
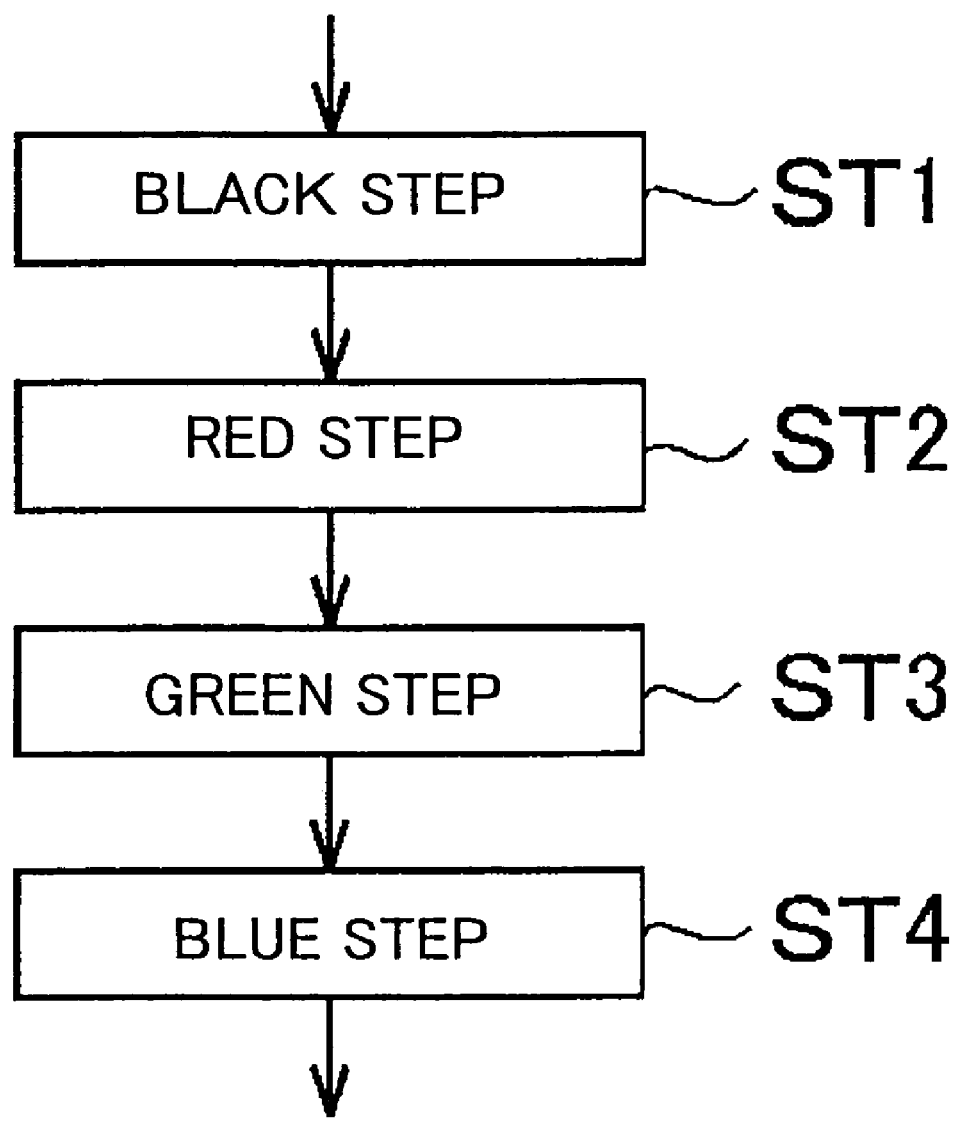
FIG. 3 is a flowchart of a production method of the liquid crystal display device according to the present invention.

FIG. 3 is a flowchart of a production method of a CF substrate shown in FIG. 2.

First, a black mask for blocking a light is formed in a Black process (ST1). Next, a transmission CF portion (CFT) and a reflection CF portion (CFR) of a pixel to be colored red among the RGB trio are simultaneously exposed to form a red color filter (ST2). Then, in a green pixel adjacent to the red pixel, the transmission CF portion and the reflection CF portion are simultaneously exposed to form a green filter (ST3). Finally, in a blue pixel adjacent to the green pixel, the transmission CF portion and the reflection CF portion are simultaneously exposed to form a blue color filter (ST4). In this case, at the time of forming color filters of the respective colors by exposure development processing, also CF windows can be opened at a time, so that there arises no burden in terms of processes.

Figure 4:
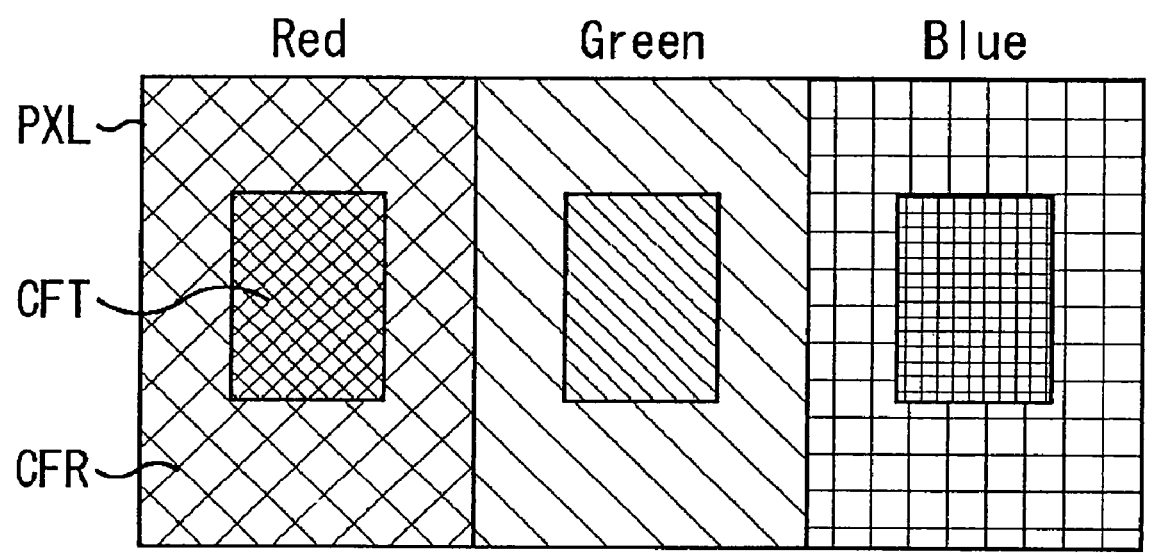
FIG. 4 is a schematic plan view of a conventional liquid crystal display device.

FIG. 4 is an example of a conventional color filter. To facilitate understanding, the same reference numbers are used for portions corresponding to the color filter of the present invention shown in FIG. 2. In the conventional method, different color filter materials were used for the transmission CF portion (CFT) and the reflection CF portion (CFR) in pixels of the respective colors. Generally, a material of the CFT has a higher coloring concentration than that of the CFR.

Figure 5:
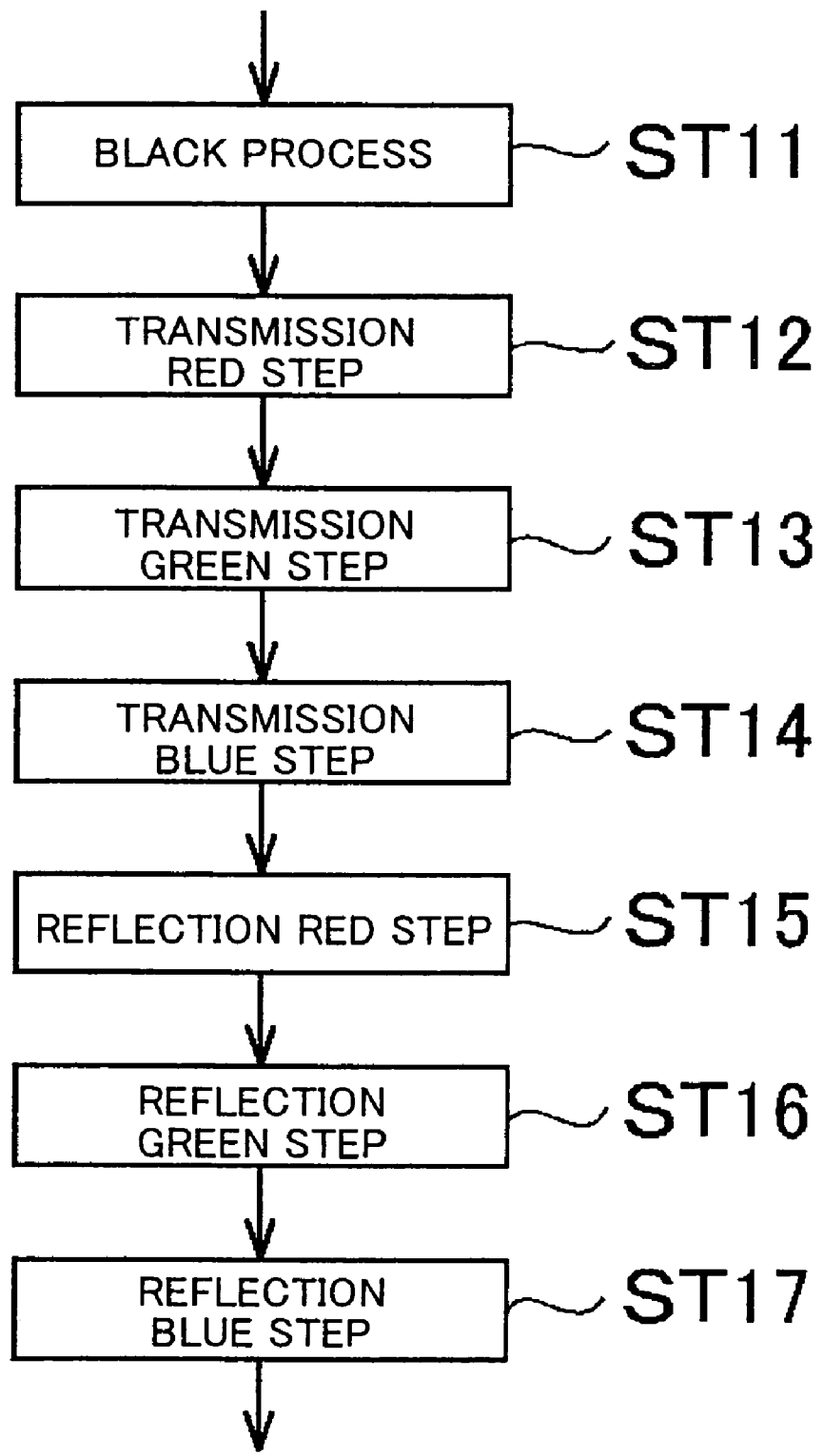
FIG. 5 is a flowchart of a production method of a conventional liquid crystal display device.

FIG. 5 is a flowchart of a production method of the color filter shown in FIG. 4. First, a black mask for blocking a light is formed in a Black process (ST11). Next, a red color filter is formed only on a transmission CF portion as a part of a pixel (ST12). Then, a green color filter is formed on a transmission CF portion as a part of a green pixel adjacent to a red pixel (ST13). Next, a blue color filter is formed on a transmission CF portion as a part of a blue pixel adjacent to the green pixel (ST14). After that, a red reflection CF is formed continuingly from the transmission CF portion of the red pixel (ST15). Next, a green reflection CF is formed continuingly from the transmission CF portion of the green pixel (ST16). Finally, a blue reflection CF is formed continuingly from the transmission CF portion of the blue pixel (ST17). From the above, RGB pixels comprising both of the transmission CF portion and the reflection CF portion are formed.

On the other hand, in the present invention, as shown in the flowchart in FIG. 2, the conventional coloring process can be halved. Note that the coloring order of red, green and blue can be changed in accordance with characteristics of respective colors.

Figure 6:
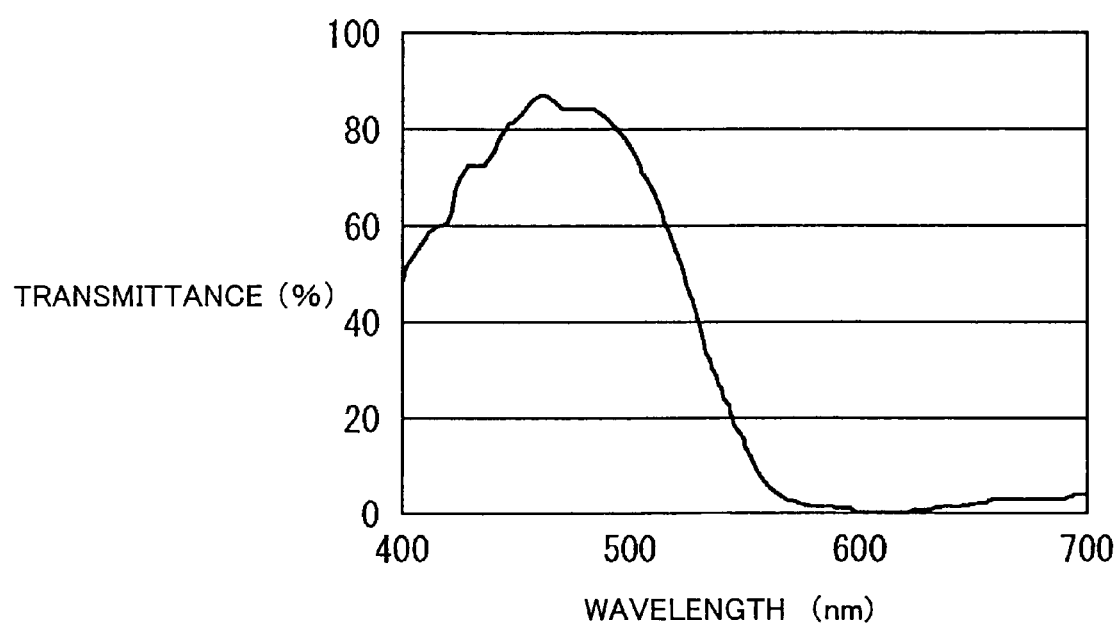
FIG. 6 is a graph of spectral transmittance of a conventional transmission CF.

FIG. 6 illustrates a spectral transmittance of the transmission portion CF of the blue pixel in the conventional method. In FIG. 6, the abscissa indicates a wavelength and the ordinate indicates a transmittance. The transmission portion CF of the blue pixel in the conventional method exhibits a peak of the transmittance at short of a wavelength of 500 nm as shown in FIG. 6.

Figure 7:
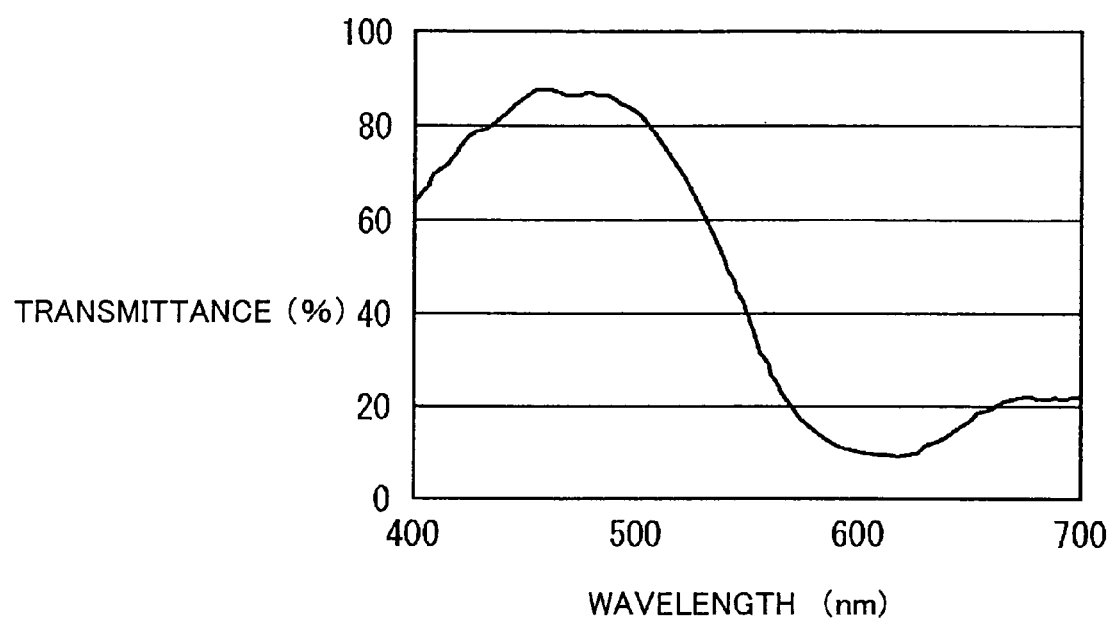
FIG. 7 is a graph of spectral transmittance of a conventional reflection CF.

FIG. 7 illustrates a spectral transmittance of the reflection portion CF of the blue pixel in the conventional method in the same way. In FIG. 7, the abscissa indicates a wavelength and the ordinate indicates a transmittance. Conventionally, different materials are used in the transmission portion CF and the reflection portion CF, so the spectral transmittance are also different. The spectral transmittance of the reflection portion CF has a broader spectral characteristics comparing with that of the transmission portion CF and the transmittance rises over the whole visible wavelength range.

On the other hand, in the present invention, the spectral transmittance of the color filter is basically identical in the transmission region and the reflection region. By opening the CF windows on the reflection region, a light transmitted through the CF window reflects without being colored by the color of the color filter. An observer recognizes the most light reflected on the reflection portion of pixels and colored by the color filter together with a color-free light as a part passed through the CF windows and, as a result, recognizes as a color, wherein a coloring concentration is faded, which is similar to that of a conventional reflection type color filter.

Logically, the spectral transmittance in the case of further providing the CF windows to the conventional transmission type CF can be given from the following formula.

$$T_{CF} = T_W^2 * S + T_R^2 * (1-S)$$

Here, "$T_{CF}$" indicates a transmittance after combining, "$T_W$" indicates a transmittance of the CF windows, "S" indicates an aperture ratio of the CF windows and "$T_R$" indicates a transmittance of the CF. Also, the aperture ratio "S" of the CF windows can be given from (an area of CF window)/(a CF area of one pixel).

Figure 8:
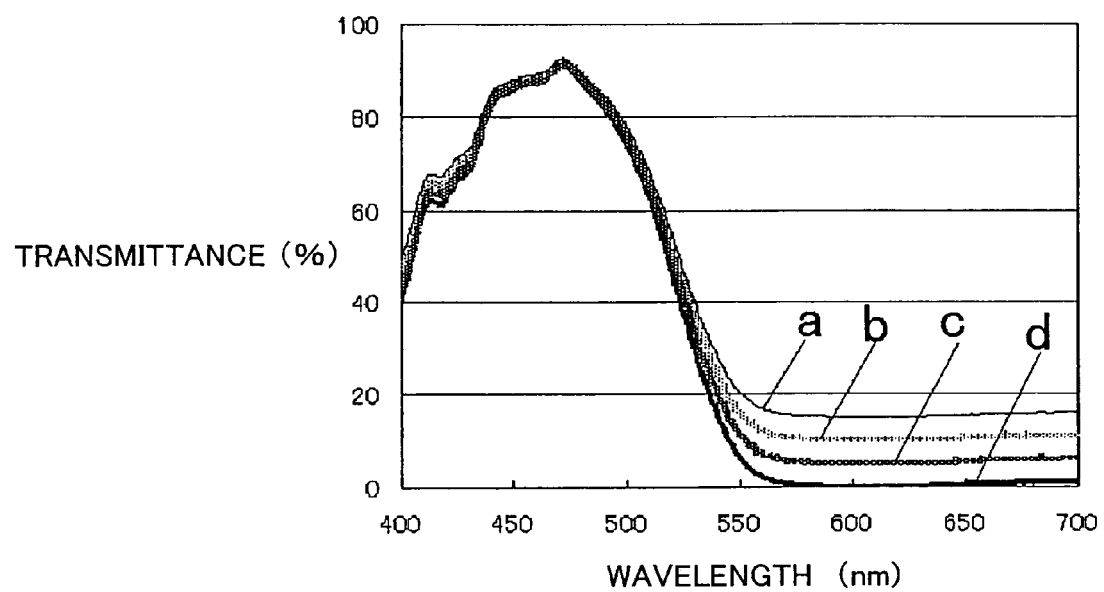
FIG. 8 is a graph of spectral transmittance of a reflection CF according to the present invention.

FIG. 8 illustrates spectral transmittance characteristics of a color filter of the reflection region produced according to the present invention. Note that the spectral transmittance is obtained by a simulation based on the above formula and is a calculation result of the case where a light transmits the color filter twice by assuming the case of a reflection region. In FIG. 8, the abscissa indicates a wavelength and the ordinate indicates transmittance.

Also, in FIG. 8, a curve "a" indicates a spectral transmittance when the aperture ratio of the CF windows is 15%. Similarly, a curve "b" indicates the case where the aperture ratio of the CF windows is 10%, and a curve "c" indicates the case where the aperture ratio of the CF windows is 5%. Note that a curve "d" indicates a spectral transmittance of a conventional transmission type CF. Here, the aperture ratio of the CF windows is important, and the total transmittance $T_{CF}$ after combining can be adjusted by changing it.

To change the aperture ratio, a method of changing the number and a size of the CF windows can be applied. Namely, to optimize the aperture ratio, a color filter having spectral characteristics close to those of a color filter applied to a conventional reflection type can be obtained. Also, the color tone widely changes when the aperture ratio changes by a few percents or so, so that high processing accuracy is required for forming the CF windows.

Also, total chromaticity x and y of the color filter provided with the CF windows can be obtained from the following formulas.

$$X = K * \int_{380}^{780} T_{CF}(\lambda) * S(\lambda) * \bar{x}(\lambda) d\lambda$$

$$Y = K * \int_{380}^{780} T_{CF}(\lambda) * S(\lambda) * \bar{y}(\lambda) d\lambda$$

$$Z = K * \int_{380}^{780} T_{CF}(\lambda) * S(\lambda) * \bar{z}(\lambda) d\lambda$$

$$K = \frac{100}{\int_{380}^{780} S(\lambda) * \bar{y}(\lambda) d\lambda}$$

$$x = \frac{X}{X+Y+Z}, y = \frac{Y}{X+Y+Z}, z = \frac{Z}{X+Y+Z}$$

Note that $S(\lambda)$ indicates spectral intensity of a light source, $\bar{x}(\lambda)$, $\bar{y}(\lambda)$ and $\bar{z}(\lambda)$ are color matching functions based on the CIE1931.

Figure 9:
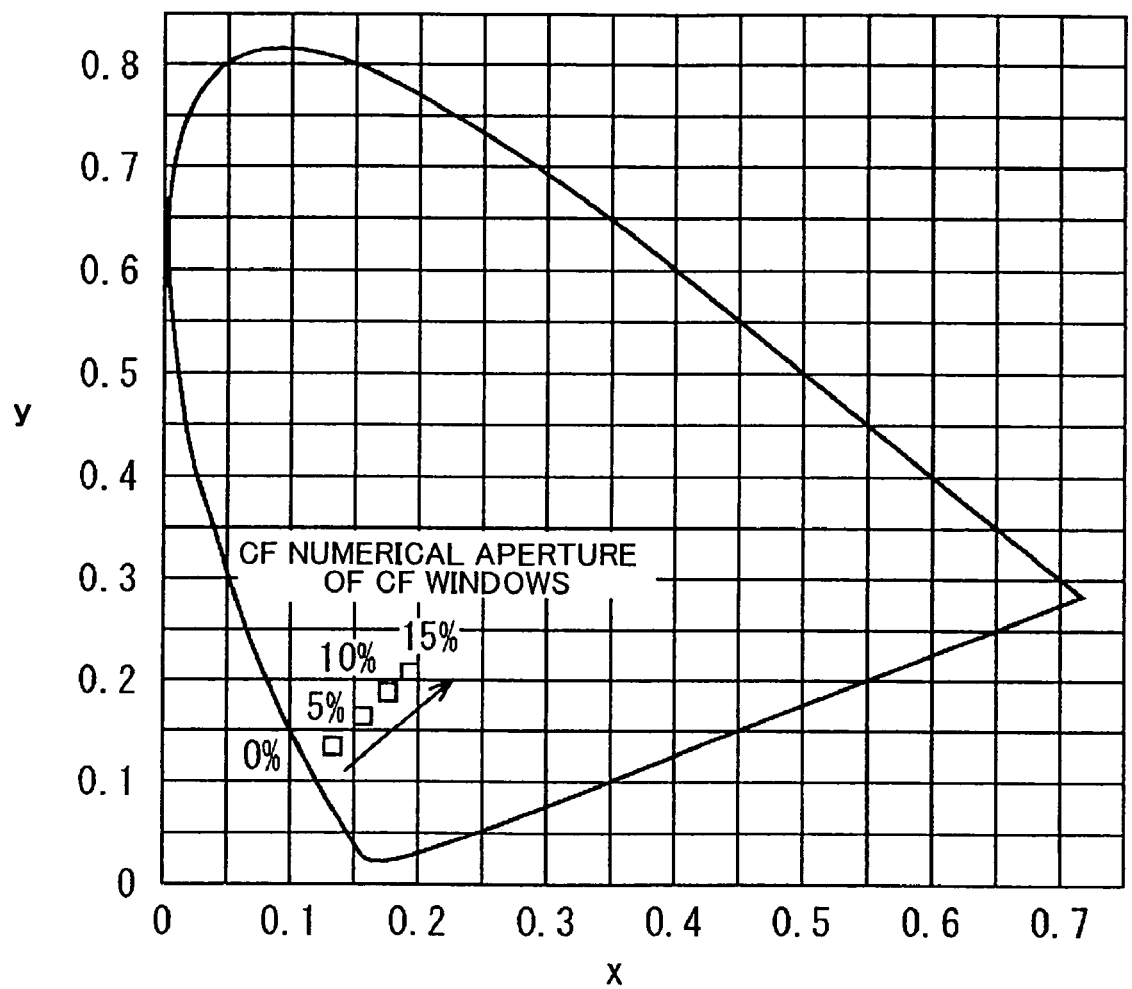
FIG. 9 is a chromaticity diagram of the reflection CF according to the present invention.

As is clear from the above formulas, chromaticity depends on the $T_{CF}$. The xy chromaticity diagram in FIG. 9 is a graph thereof. When the aperture ratio of the CF windows is increased from 5% to 15%, the chromaticity of the blue color filter moves to the center on the xy plane. By adjusting the aperture ratio of the CF windows, the chromaticity of the color filter can be optimally set.

Figure 10A:
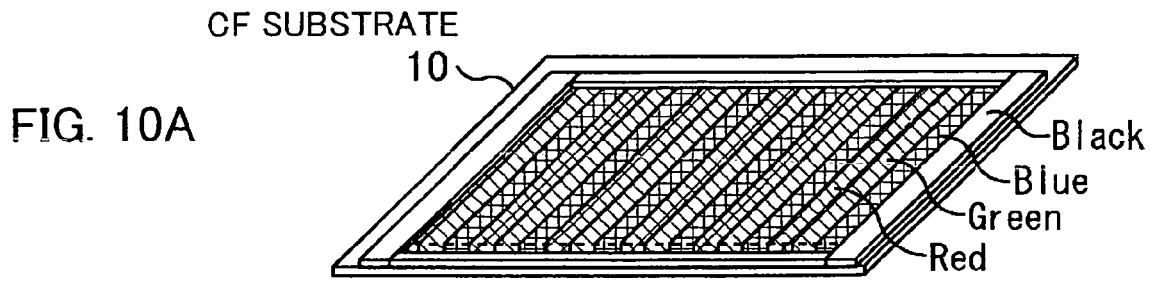
FIGS. 10A to 10C are disassembled perspective views of the general configuration of a hybrid type liquid crystal display device.
Figure 10B:
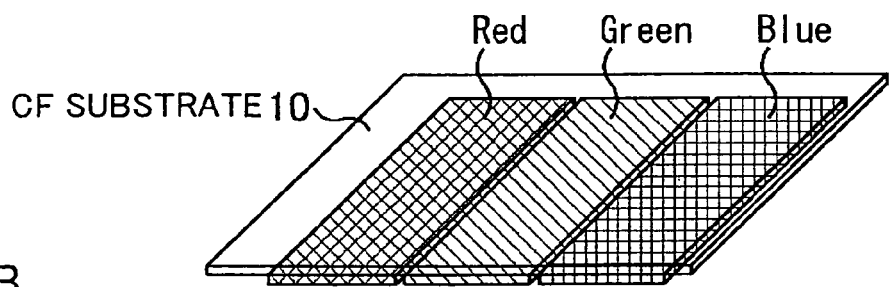
Figure 10C:
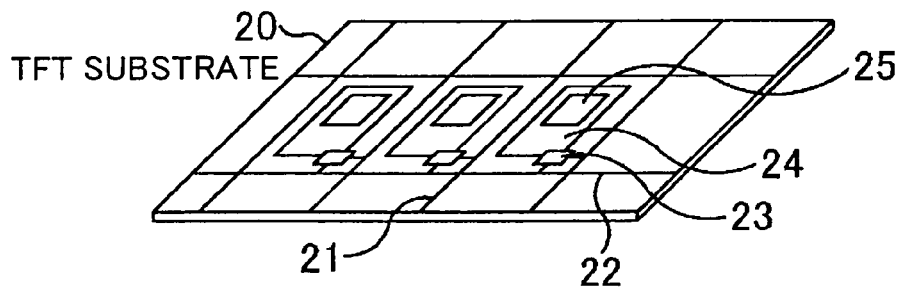
Figure 10C:
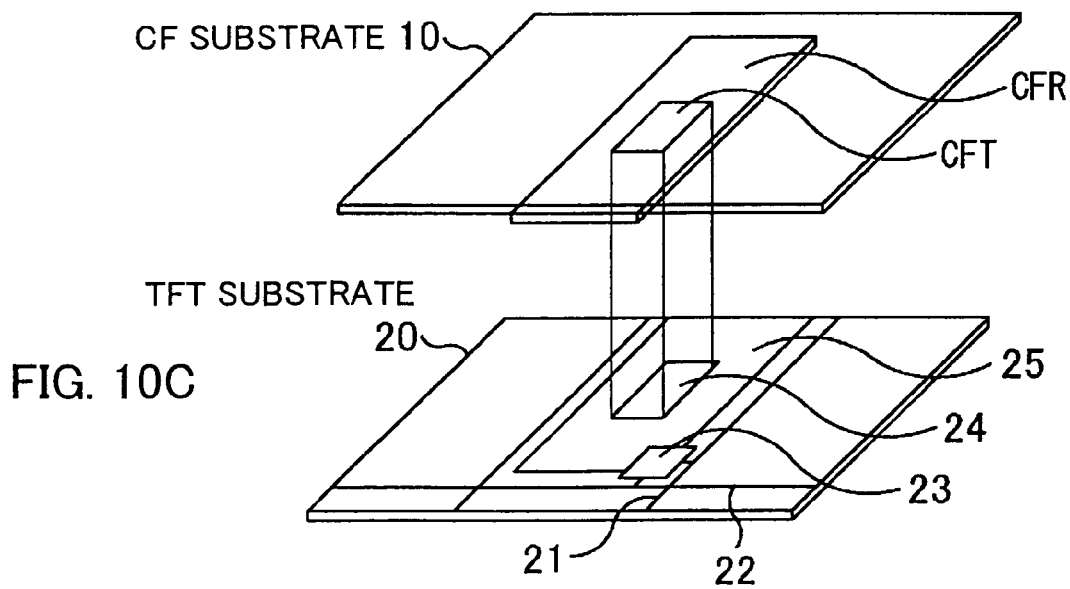

FIGS. 10A to 10C are schematic views of the general configuration of a hybrid type liquid crystal display device.

In FIG. 10A to FIG. 10C, the reference number 10 indicates a first (CF) substrate and 20 indicates a second (TFT) substrate. The TFT substrate 20 is formed signal lines 21, gate lines 22, pixel transistors 23, reflection electrodes 24 and transparent electrodes 25.

FIG. 10A shows the general configuration of the first (CF) substrate 10. A red pattern, a green pattern and a blue pattern are formed in a stripe shape on a transparent base made by a glass, etc. Furthermore, a black pattern is formed to surround the RGB pattern. As explained above, the patterns of respective colors can be formed by successively repeating film forming of photosensitive coloring material and photolithography.

FIG. 10B shows three pixels of a liquid crystal display device. A plurality of pixels are formed on the TFT substrate 20 side. To corresponding thereto, a red pattern, a green pattern, and a blue pattern in a stripe shape are formed on the CF substrate 10 side. A reflection electrode 24 composing a reflection portion and a transparent electrode 25 composing the transmission portion are formed on respective pixels on the TFT substrate 20. Furthermore, a pixel transistor 23 is formed to drive a pixel electrode composed of the reflection electrode 24 and the transparent electrode 25. The pixel transistor 23 is a thin film transistor, wherein a gate electrode of the pixel transistor 23 is connected to the gate line 22 and a source electrode is connected to the signal line 21.

FIG. 10C is a further enlarged perspective view of one pixel. A color filter is formed on the CF substrate 10 so as to be corresponding to pixels formed on the TFT substrate 20. In the general configuration, the reflection region CFR corresponding to the reflection electrode 24 and the transmission region CFT corresponding to the transparent electrode use different color filter materials.

Figure 11A:
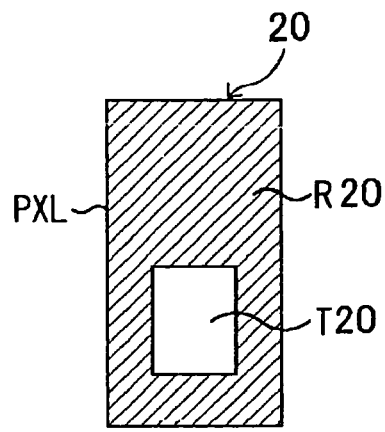
FIGS. 11A to 11C are schematic views of a specific example of a color filter according to the present invention.
Figure 11B:
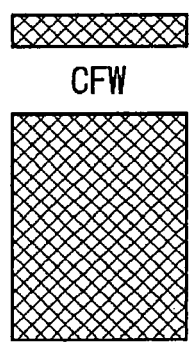
Figure 11C:
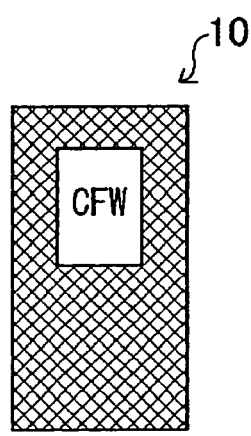

On the other hand, in the present invention, a common color filter is formed for the reflection region and the transmission region, and the CF windows are provided on the reflection region. A specific example of the CF windows is shown in FIG. 11A to FIG. 11C. FIG. 11A shows the configuration on the TFT substrate 20 side, wherein the pixel PXL is divided to a transmission portion T and the reflection portion R. A size of the pixel PXL is, for example, 100 μm×300 μm.

FIG. 11C is the configuration on the CF substrate 10 side produced according to the present invention, and one window CFW is formed in the reflection region. The CFW is formed inside the reflection region away from the surrounding edges thereof by 2 μm or more. A size of the CF window is, for example, 60 μm×100 μm and the aperture ratio is set to 20%.

FIG. 11B shows a reference example, wherein the window CFW is formed in the same way as in FIG. 11C but is not formed in the reflection region but extending to the surrounding edges of the reflection region.

Figure 12A:
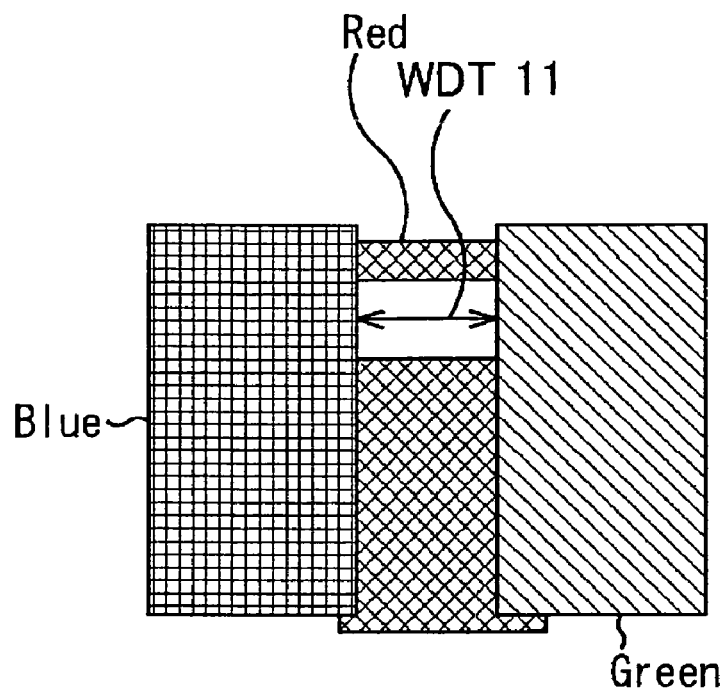
FIGS. 12A and 12B are schematic views of a color filter according to a reference example.
Figure 12B:
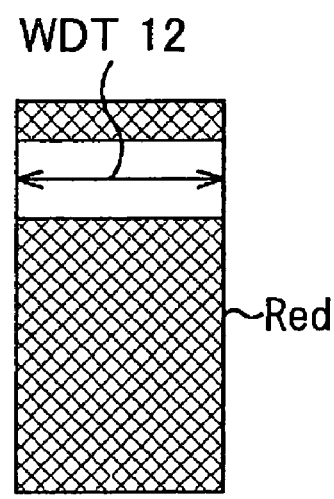

FIGS. 12A and 12B illustrate a disadvantage of the case of forming a color filter of the reference example shown in 11B. The reference number WDT11 in FIG. 12A indicates a width of the CF window affected by deviation, and the reference number WDT12 in FIG. 12B indicates a width of the original CF window.

As shown in FIG. 12A, when forming color filters, for example, in the coloring order of R, G and B in the CF forming process, a green pattern is aligned with respect to a red pattern by leaving a certain error. Similarly, a blue pattern is aligned with respect to the green pattern by leaving a certain error in the same way. As a result, as shown in FIG. 12A, there arises the case that the CF window is blocked by adjacent CFs due to the alignment errors. In this case, a predetermined aperture ratio of the CF windows cannot be maintained, and there arises deviation of color tone on the color filter on the reflection region.

Figure 1A:
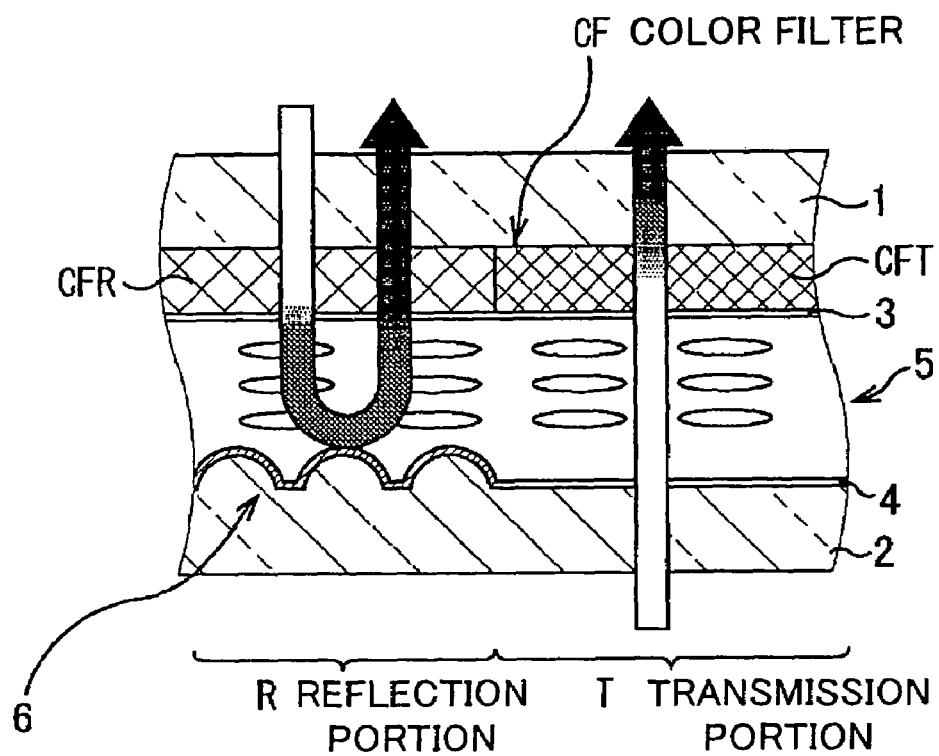
FIGS. 1A and 1B are schematic views of an example of a conventional hybrid type liquid crystal display device.
Figure 1B:
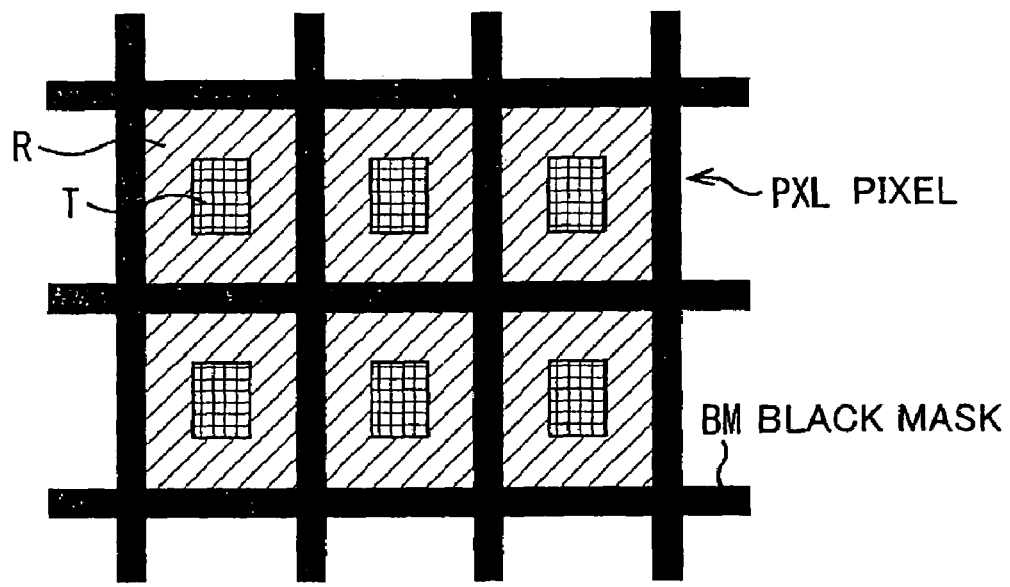

To prevent such a problem, as shown in FIG. 1C, it is sufficient if the CF window is formed away from edges of the CF by leaving a distance of at least an amount that the adjacent CFs are deviated due to the alignment errors. Normally, it is sufficient if the CF window is formed inside by leaving a distance of 2 μm or more from surrounding edges of the reflection region. More preferably, it is suitable to leave 3 μm or more. Note that when alignment accuracy is improved, the limit of the distance naturally becomes less.

Figure 13:
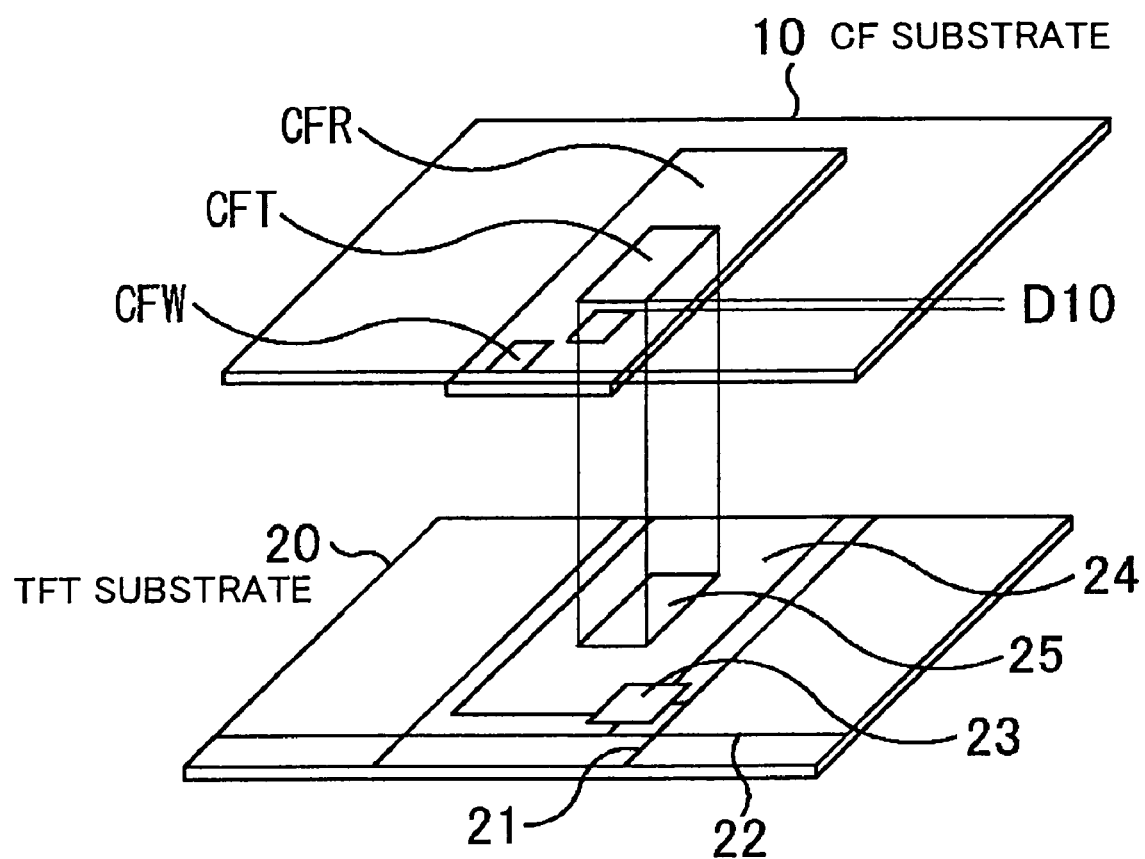
FIG. 13 is a disassembled perspective view of the configuration of a hybrid type liquid crystal display device according to the present invention.

FIG. 13 is the overall configuration of a liquid crystal display device wherein CF windows are formed on the reflection region of the CF substrate as explained above. The reference number D10 in FIG. 13 indicates a distance between the transparent electrode 25 on the TFT 1 side and a CF window.

As shown in FIG. 13, the CF substrate 10 is assembled to be a liquid crystal panel by being superposed with the TFT substrate 20. The reflection electrode 24 on the TFT substrate 20 is formed by a light reflecting film, and the transparent electrode 25 is formed by a light transmitting film. The both substrates 10 and 20 are superposed so that a pattern on the color filter on the CF substrate 10 superposes with a pattern of the pixel electrode composed of the reflection electrode 24 and the transparent electrode 25 on the TFT substrate 20. At this time, a CF window (CFW) is formed on the reflection region CFR on the CF substrate 10 side.

Accordingly, the CF window must not be superposed with the transparent electrode portion on the TFT substrate 20 side. However, there actually arises an alignment error between the both substrates 10 and 20 due to a mechanical error of a superposing apparatus. When such alignment deviation arises, a CF window having a faded color concentration is observed through the transparent electrode, so that the display quality is largely deteriorated. Thus, to prevent this, it is preferable to form a CF window away from the transparent electrode 25 by leaving a distance caused by alignment deviation or more.

As a result, even if alignment deviation arises between the both substrates, the transmission CF corresponds to the transparent electrode, so that a color concentration does not deteriorate. Considering alignment accuracy between the both substrates, the distance D10 between the CF window and edges of the transparent electrode 25 on the TFT side is preferably 2 to 3 μm. Naturally, when alignment accuracy is improved, the limit of the distance can be made less.

Generally, an exposure apparatus for photolithography used in the CF process is called a proximity exposure apparatus, by which a parallel light is irradiated from the light source side to the mask. The exposure processing is performed in a state where mask and the substrate are closely arranged by leaving certain constant distance so as not to touch each other. The distance between the mask and the substrate at this time is called an exposure gap and is a significant factor to determine exposure accuracy.

Figure 14:
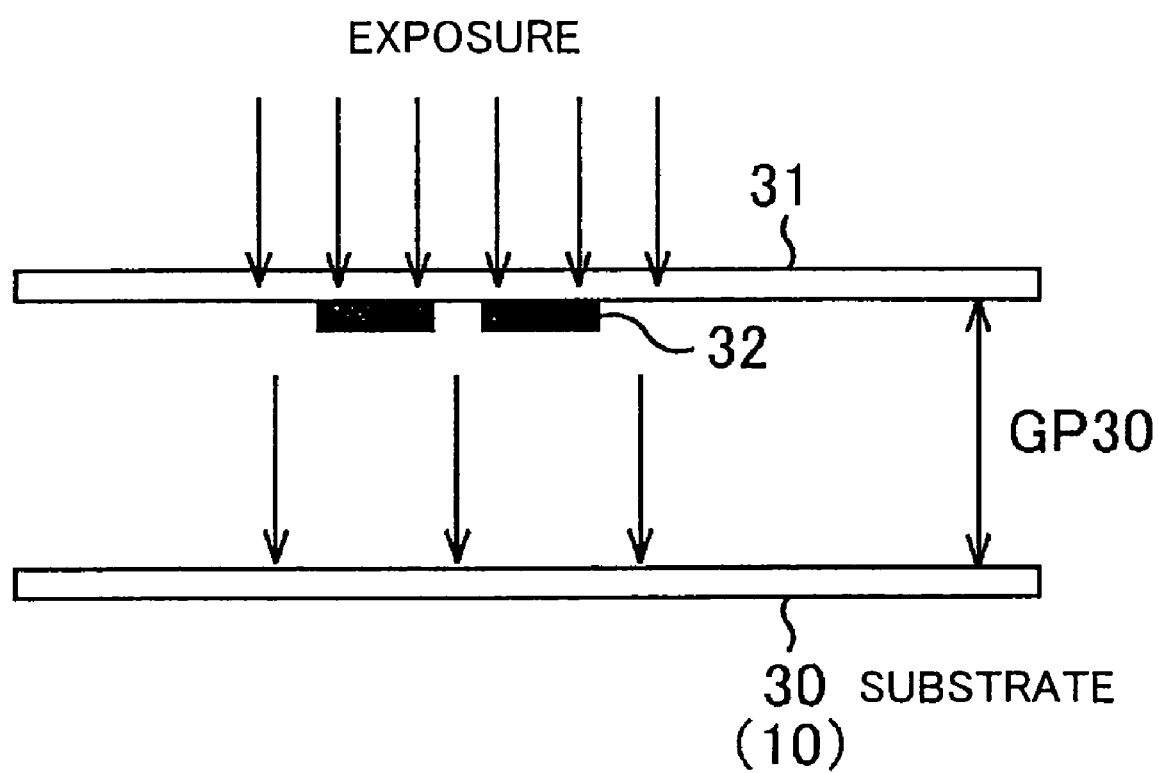
FIG. 14 is a schematic view of a patterning method of a color filter.

FIG. 14 is a schematic view of a patterning method of the color filter. In FIG. 14, the reference number 30 indicates a substrate, 31 indicates a photomask, 32 indicates light block films and GP30 indicates the exposure gap.

As shown in FIG. 14, when the exposure gap GP30 is small, diffraction light intensity depending on a pattern arrangement of the light block film 32 of the photomask 31 becomes small. When the exposure gap GP30 becomes large, the diffraction light intensity becomes large and a diffraction pattern gradually increases. Therefore, pattern forming faithful to the light block film 32 pattern on the photomask 31 side becomes impossible.

Considering such a diffraction phenomena, when arranging a plurality of CF windows adjacent to each other, it is important to arrange the CF windows having a certain distance in advance. Due to this, a pattern unevenness caused by diffraction can be prevented. In the illustrated example, when the exposure gap GP30 is set to 150 μm, it is preferable that a distance between CF windows is 10 μm or more, more preferably 20 μm or more. When reducing the exposure gap GP30, the distance between the CF windows can be also reduced.

Note that, in the example shown in FIG. 14, a CF window is formed by forming a light block film 32 on the photomask 31 and performing exposure processing. In this case, since a coloring layer of the color filter is completely removed from the CF window, the coloring concentration becomes 0. Instead of this, CF windows wherein the color filter on the CF window is left to a certain extent to have a lowered color concentration may be also used. Specifically, by creating a half exposure condition by using a light block film pattern in a slit shape, a film thickness of the coloring layer of the CF window can be made thin.

Figure 15A:
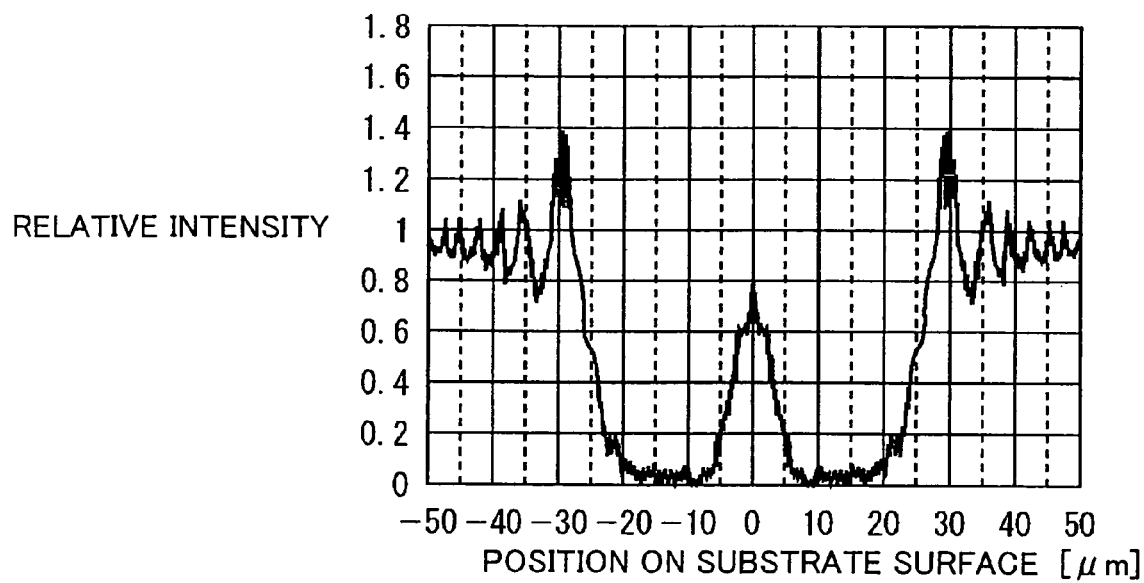
FIGS. 15A and 15B are graphs of relative intensity distribution of an exposure light amount.
Figure 15B:
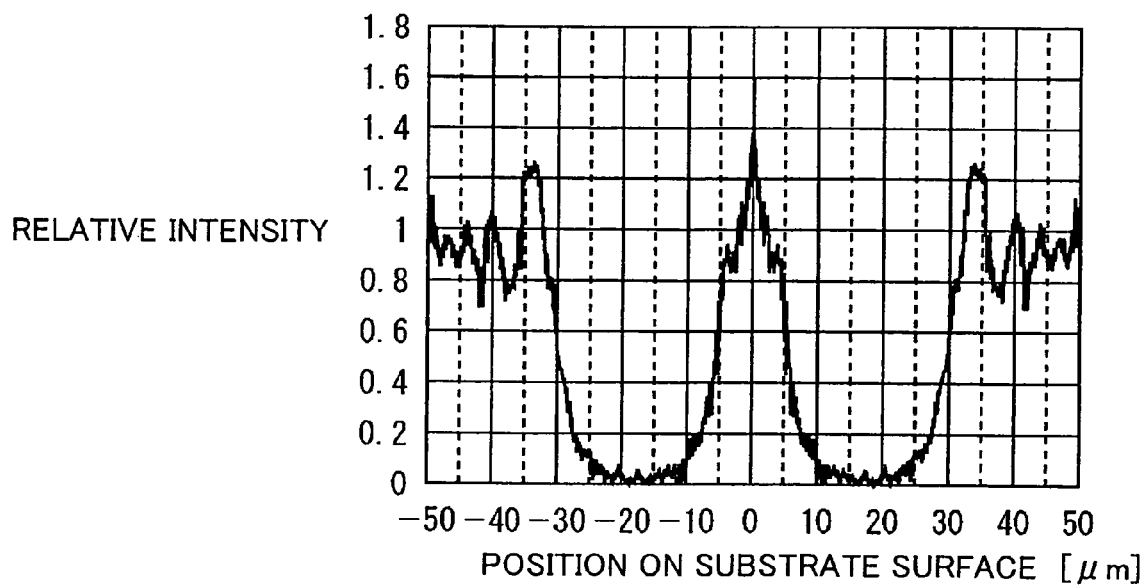

Graphs in FIG. 15A and FIG. 15B show an exposure amount reaching to the substrate in the case where the exposure gap is set to 150 μm and a width size of the light block film pattern is set to 20 μm. FIG. 15A shows the case where the distance between CF windows is set to 6.5 μm. On the other hand, FIG. 15B shows the case where the distance between CF windows is set to 15 μm. In FIG. 15A and FIG. 15B, the abscissa indicates a position on the substrate surface and the ordinate indicates relative intensity.

When the distance between the CF windows is 15 μm, a sufficient light amount reaches between the CF windows and patterning faithful to the light block film pattern becomes possible. On the other hand, when the distance between the CF windows is 6.5 μm, a sufficient exposure light does not reach between the CF windows due to diffraction. This means that size variation between the CF windows is easily caused. Furthermore, the exposure gap varies due to warps of the photomask or substrate surface. Even in such cases, a stable light amount can be obtained by separating adjacent CF windows by keeping a distance of at least 10 μm, preferably 15 μm or more.

Figure 16:
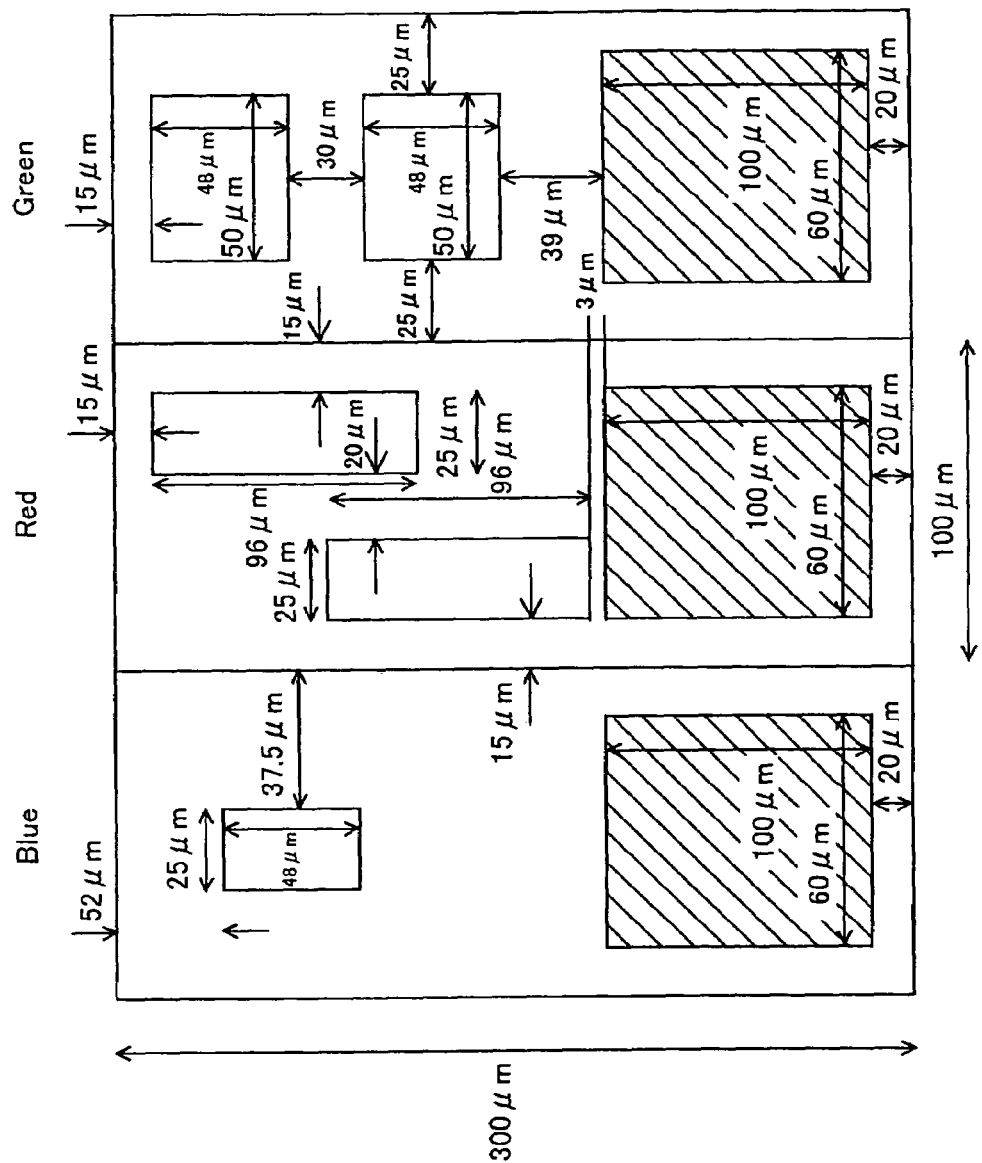
FIG. 16 is a schematic plan view of a specific example of a color filter according to the present invention.

FIG. 16 is a schematic plan view of a specific example of the CF window of the color filter. FIG. 16 illustrates a set of RGB three pixels, wherein sizes of CF windows are optimized for the respective CF windows to obtain preferable color tone for color display. In the blue pixel, one CF window is provided, by which the aperture ratio of 5% is aimed. In the red pixel, two CF windows are provided, by which the aperture ratio of 20% is aimed. Similarly, in the green pixel, two CF windows are provided, by which the aperture ratio of 20% is aimed.

Not only by optimizing the number and size of the CF windows as above, but by devising an arrangement thereof a so-called moiré is prevented from arising. Namely, by setting different coordinates to be arranged of CF windows for respective pixels, a moiré caused by a cyclic configuration is suppressed and the display quality is improved. Specifically, as shown in the figure, the CF windows are made not to have the same distance and arrangement angles between respective RGB pixels.

When providing a plurality of CF windows, an arrangement of CF windows of other color is made to have a different angle and distance from those of a CF window arrangement of the adjacent color. Due to this, color unevenness due to the moiré phenomenon can be prevented.

Namely, in a color filter according to the present invention, when arranging a plurality of windows respectively for pixel regions of different colors, arrangement directions of the plurality of windows are different between pixel regions of different colors. Consequently, the moiré can be prevented. Also, when arranging one window in the respective pixel regions of different colors, the arrangement coordinates of the respective windows are different between pixel regions of different colors. Consequently, the moiré can be prevented.

In the specific example in FIG. 16, a black mask in lattice is not formed between the RGB pixels, so that pixel regions of different colors are directly next to each other without the black mask. In the case of such a configuration, declining of the contrast can be prevented by forming CF windows inside the respective pixel regions. Assuming that the windows are formed not inside the pixel regions but on the frames along the pixel regions, the CF windows are formed exactly at the position of the black mask. In such a pattern, a reflection light is emitted as it is from the lattice CF windows, so that the black level becomes weak and the contrast declines. On the other hand, since the CF windows are provided inside the pixel regions in the present invention, the contrast can be maintained even in the configuration without a black mask.

Figure 17:
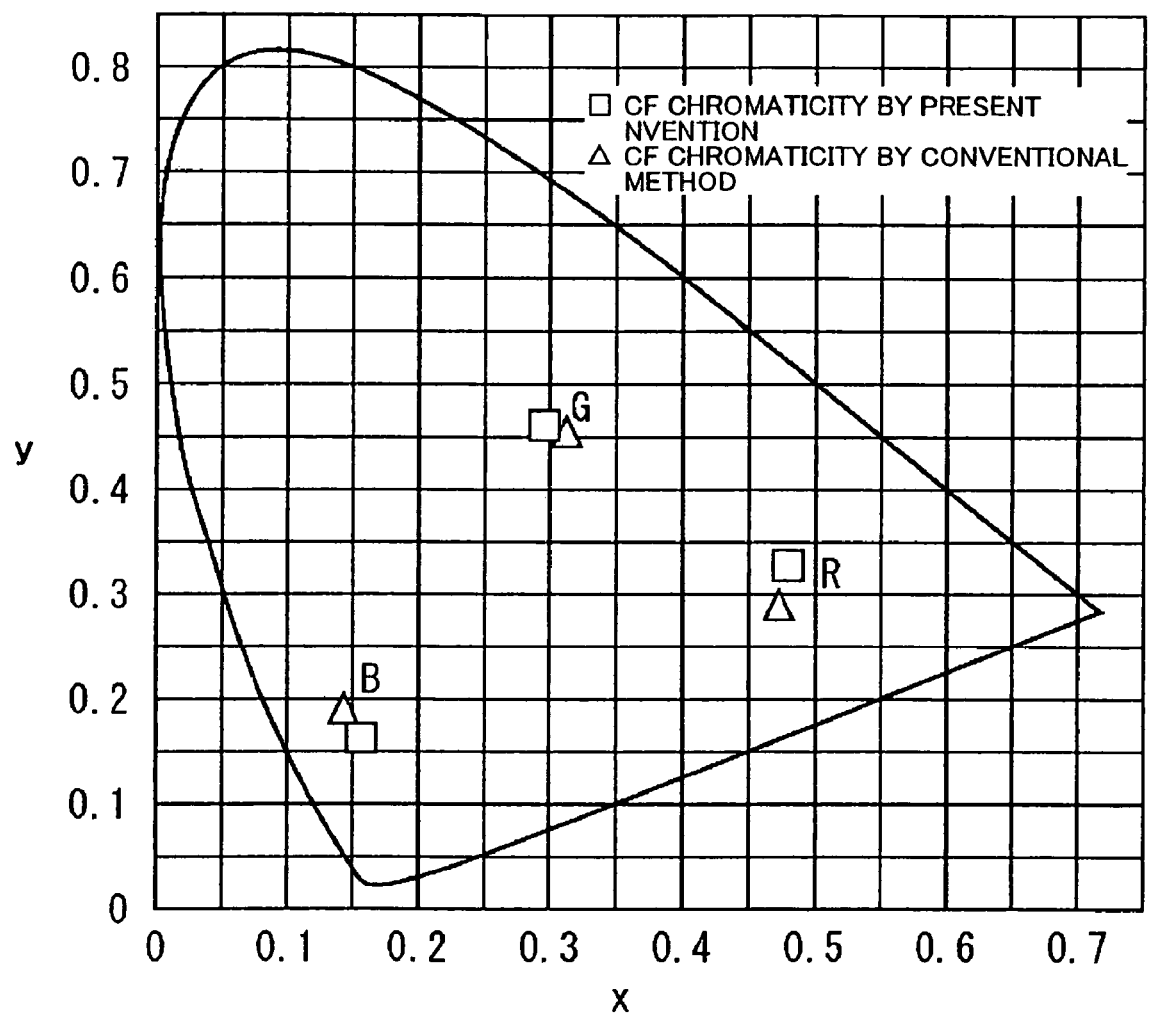
FIG. 17 is a chromaticity diagram of the color filter shown in FIG. 16.

FIG. 17 is a graph of the chromaticity of a reflection CF of the color filter shown in FIG. 16. In the illustrated xy chromaticity diagram, the CF chromaticity by the present invention is indicated by a "□" mark and the CF chromaticity by the conventional method is indicated by a "Δ" mark. In the conventional method, a color filter adjusted to a reflection region is used. On the other hand, in the present invention, a condition close to the chromaticity of the reflection CF is obtained by providing CF windows to an originally transmission type color filter. As is clear from the graph, the chromaticity of the reflection CF by the present invention is almost the same as that of the reflection CF by the conventional method. As is clear from the FIG. 17, according to the present invention, it became possible to maintain complementary for the chromaticity while realizing a reduction of processes and reduction of costs.

Figure 18:
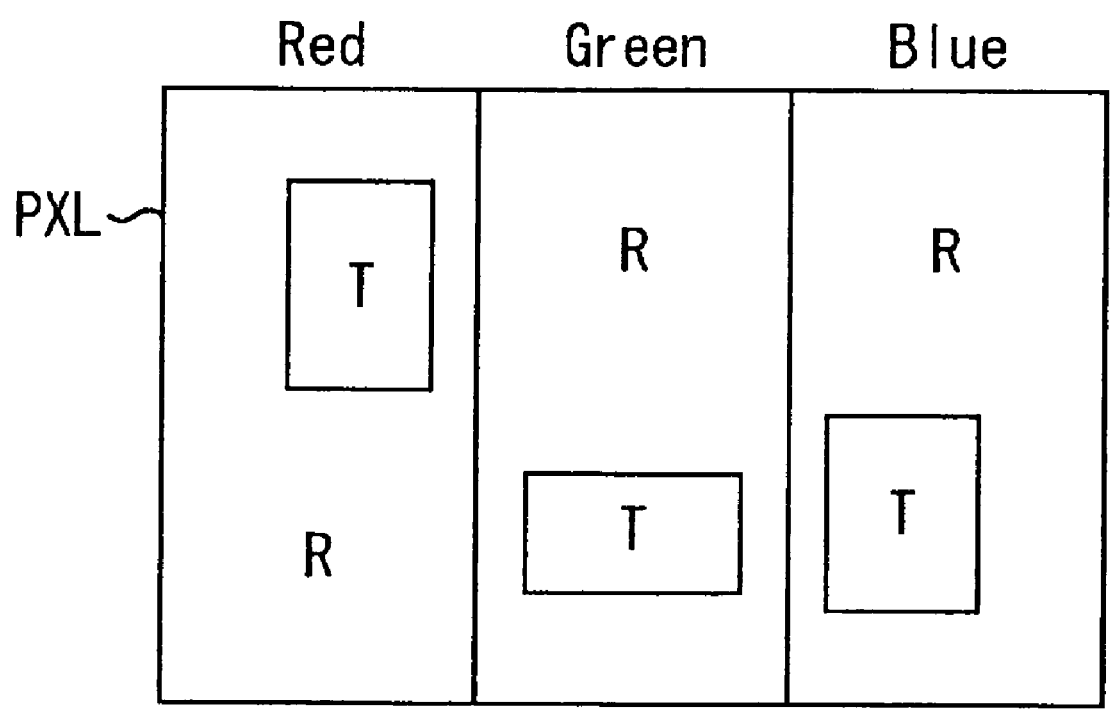
FIG. 18 is a schematic plan view of another embodiment of a liquid crystal display device according to the present invention.

FIG. 18 is a schematic view of other aspect of the present invention.

As explained above, a liquid crystal panel comprises a CF substrate 10 and a TFT substrate arranged facing to each other over a liquid crystal layer. As shown in the figure, the TFT substrate is formed pixels PXL arranged in matrix, and each pixel is formed a reflection portion R to reflect an outside light and a transmission portion T to transmit a light. On the other hand, the CF substrate is formed a color filter for coloring each of the pixels PXL to be different colors (red, green and blue).

As is clear from FIG. 18, the arrangement coordinates of the transmission portion T in a pixel differ between pixels PXL colored to be different colors. By applying a random arrangement configuration as above, a regular pattern is removed as much as possible and a moiré can be suppressed.

INDUSTRIAL APPLICABILITY

In a liquid crystal display device of the present invention, a transmission type color filter and a reflection type color filter are simultaneously formed, so that the production process can be reduced to ½ of the conventional method and a reduction of costs can be realized. Therefore, the liquid crystal display device can be applied, for example, to a so-called hybrid type liquid crystal display device wherein both of a reflection portion and a transmission portion are provided in each pixel.

The invention claimed is:

1. A liquid crystal display device, comprising a first substrate and a second substrate arranged facing each other with a liquid crystal layer therebetween, pixels arranged in a matrix, and each pixel comprises a reflection portion to reflect light and a transmission portion to transmit light; and a color filter is secured to the second substrate for coloring respective pixels to be different colors;

wherein each of a plurality of pixels has one or more color adjusting windows located at the reflection portion of the pixel through which light passes without passing through a color filter material of the remaining portions of the pixel, wherein each color adjusting window is formed to be of substantially a same size and shape and a number of color adjusting windows located within a pixel is different for pixels of at least two different colors and at least one pixel has a plurality of color adjusting windows separately provided in the single pixel.

* * * * *